No. 701,881. Patented June 10, 1902.
P. E. HODGKIN & G. E. KENNEY.
TYPE DISTRIBUTING MACHINE.
(Application filed Dec. 8, 1899.)
(No Model.) 9 Sheets—Sheet 2.

No. 701,881. Patented June 10, 1902.
P. E. HODGKIN & G. E. KENNEY.
TYPE DISTRIBUTING MACHINE.
(Application filed Dec. 8, 1899.)
(No Model.) 9 Sheets—Sheet 3.

No. 701,881. Patented June 10, 1902.
P. E. HODGKIN & G. E. KENNEY.
TYPE DISTRIBUTING MACHINE.
(Application filed Dec. 8, 1899.)
(No Model.) 9 Sheets—Sheet 5.

No. 701,881. Patented June 10, 1902.
P. E. HODGKIN & G. E. KENNEY.
TYPE DISTRIBUTING MACHINE.
(Application filed Dec. 8, 1899.)
(No Model.) 9 Sheets—Sheet 7.

No. 701,881. Patented June 10, 1902.
P. E. HODGKIN & G. E. KENNEY.
TYPE DISTRIBUTING MACHINE.
(Application filed Dec. 8, 1899.)
(No Model.) 9 Sheets—Sheet 9.

UNITED STATES PATENT OFFICE.

PHILIP ELIOT HODGKIN AND GEORGE ENOS KENNEY, OF LONDON, ENGLAND.

TYPE-DISTRIBUTING MACHINE.

SPECIFICATION forming part of Letters Patent No. 701,881, dated June 10, 1902.

Application filed December 8, 1899. Serial No. 739,658. (No model.)

*To all whom it may concern:*

Be it known that we, PHILIP ELIOT HODGKIN, residing at Nine Elms, London, and GEORGE ENOS KENNEY, residing at Battersea Park road, London, England, subjects of the Queen of Great Britain and Ireland, have invented Improvements in Type-Distributing Machines, of which the following is a specification.

This invention has reference to type-distributing machines of the kind in which ordinary types in galley form from a printing-machine can be distributed into separate compartments for future use; and it has for its object to simplify the construction and improve the working of such machines.

For this purpose the invention consists in improved means for separating the lines of type from a column of type and placing each of them in turn in a feeding-trough, means for separating the types and spaces from the line of types and discharging them through special exit-holes, means for dividing the types into different groups, and means for separating the types belonging to each group from each other.

The invention also consists in various combinations and arrangements of parts hereinafter more fully explained, and pointed out in the claims.

Figures 1 and 2 of the accompanying illustrative drawings show in front elevation and plan, respectively, one construction of type-distributing machine according to this invention. Fig. 11 shows in detail, and Fig. 12 in section on the line H H of Fig. 11, type-distributing plates or shutters and operating means therefor. Fig. 13 shows in detail a part hereinafter referred to.

$a$ is a galley adapted to contain and guide the column $b$ of types to be distributed. The front end of this galley is closed by a fixed wall $c$, the rear side of which, at a height about half that of the types $b$, is recessed at $d$ to an extent sufficient to receive and support a line of types, this recessed part being in line with a trough or guideway $e$, that extends at right angles to the galley $a$.

Figure 5:
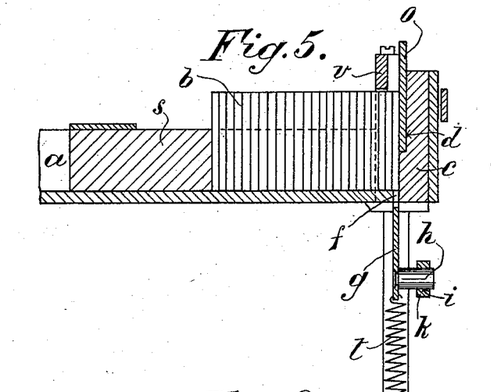
Figs. 5, 6, 7, and 8 show parts of the machine in section on the lines C C, D D, E E, and F F, respectively, of Fig. 2.
Figures 6, 7, 8:
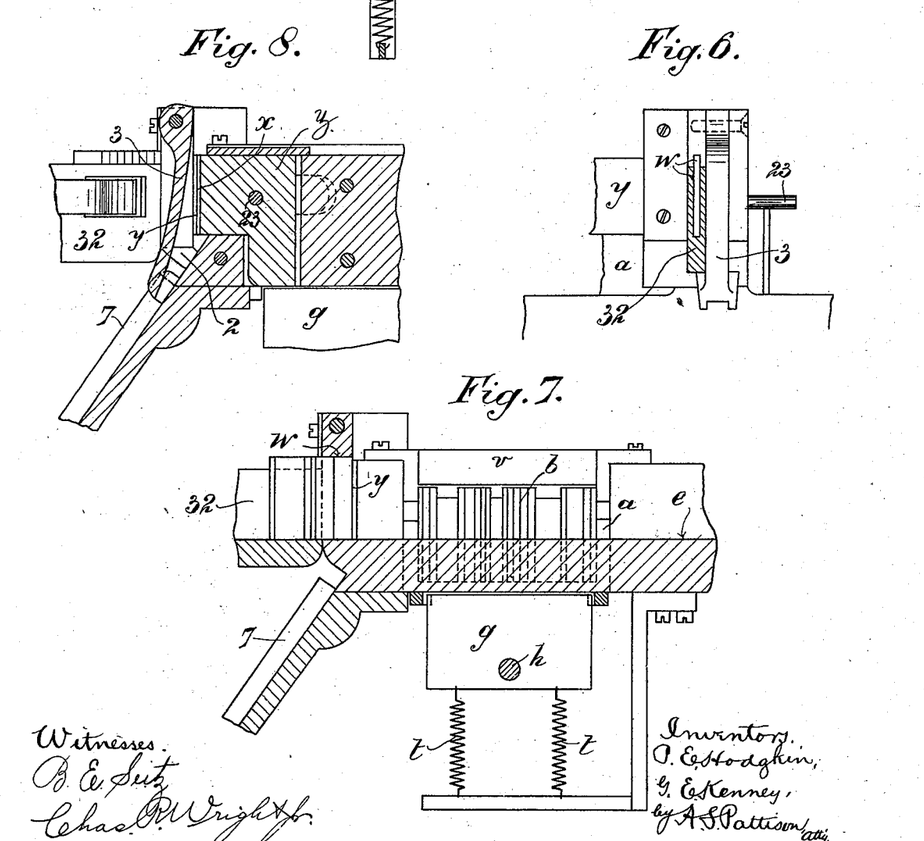

Through the floor of the gallery $a$, adjacent to the front wall $c$, is a slot $f$, fitted with a vertically-movable plate $g$, that has a thickness corresponding to the thickness of a line of types $b$, Fig. 5. This plate is provided with a pin $h$, that extends through a hole $i$ in one end of a lever $k$, that is pivoted at $l$, and the other end of which is provided or formed with an upward or lateral extension $m$, Fig. 1, arranged in the path of a tappet $n$, pivoted to a line-follower $o$, that is constantly forced by suitable means, such as a cord $p$, passing over pulleys $q$, and a weight $r$, against the line of types in the recess $d$ and trough $e$. The arrangement is such that when the line-follower $e$ is drawn backward against the action of the weight $r$ by means of a thumb-piece $u$ the tappet $n$ will act upon the upward extension $m$, so as to depress the corresponding end of the lever $k$ and raise the other end sufficiently high to bring the line of types immediately above the plate $g$ to the level of the floor of the recess $d$, whereupon the raised line of types will be immediately forced into the recess $d$ by the column of types $b$, which is constantly pressed forward by a weighted follower $s$ acting thereon, and the lever $k$ will be released and the plate $g$ drawn down by the action of springs $t$. A stop $v$ is provided above the column of types to prevent any line of types, except the foremost one, being raised by the plate $g$. At the forward end of the trough $e$ and in line therewith is an exit-opening $w$, Fig. 7, that extends from the floor of the trough to a height equal to rather more than that of a space, but less than that of a type, and through which spaces will be automatically forced when brought up thereto. At the same end of the trough and extending at right angles through its front and rear walls are two openings, the front one *x* being made variable in width and the rear one being fitted with a type-ejector *y*, by operating which the foremost type of the line thereof in the trough *e* can be forced sidewise through the front opening *x*. To render the type exit-opening *x* variable in width, one of its sides is formed by a sliding plate or block *z*, adapted to be operated by the type-keys 1 in such a way that there will be presented opposite the foremost type an opening *x* of one or other of a number of different widths, according to the thickness of the foremost type, and through which such type will be forced and brought above or opposite a type exit hole or passage 2 without rubbing against the sides of the said opening by the horizontal type-ejector *y*, which is operated from the keys 1 and the thickness of which is made rather less than that of the thinnest type to be ejected. The type exit hole or passage 2 is or may be provided with means, such as a pivoted weight 3, to prevent turning of the type falling therethrough to distributing-channels 4, Figs. 8 and 9.

In order to reduce the number of type-distributing channels 4, that would be necessary if a separate channel 4 were provided for each type, the different types to be distributed are assumed to belong according to their size to one or other of a convenient number of groups, and all the types of a group are caused to fall through the same channel 4 into a device in which the different types of the same group are separated from each other and allowed to fall into separate receptacles or troughs, in which they may be packed in line form by any suitable packing device, such as a rotary eccentric. Thus, assuming there are eighty different types to be distributed and that they are divided into sixteen groups, each containing five types varying in thickness from a thick type or capital down to a thin type, then it will suffice to provide, as in the example shown, sixteen distributing-channels 4, each leading to a type-separating device, and to make the width of the type-exit opening *x* of one or other of five different widths corresponding to the particular type that is to be separated from the line of types and which the machine operator can determine by looking either at the line of types itself or at a copy of the matter printed from the column or form the types in which are to be distributed.

In the machine shown the actual division of types in relation to their thickness is as follows: First thickness, i j l , . ; : ' ' ! ? - ( ), equal to fourteen types; second thickness, I c e f r s t z 1 2 3 4 5 6 7 8 9 0, equal to eighteen types; third thickness, J S ff fi fl a b d g h k n o p q u v x y, equal to nineteen types; fourth thickness, A B C D E F G L N O P Q R T U V X Y Z m w ffi ffl £ &, equal to twenty-five types; fifth thickness, H K M W, equal to four types, the first being the thinnest and the fifth the thickest type.

The sixteen groups, each containing five types varying in thickness, are as follows: First group, W B k c t; second group, M w fl 9 f; third group, H & y 8 .; fourth group, K O v 7 ); fifth group, ffl A x 6 (; sixth group, ffi E n 5 -; seventh group, m T q 4 ?; eighth group, D Q p 3 !; ninth group, N F fi 2 '; tenth group, U L u 1 '; eleventh group, X P h z :; twelfth group, £ C g 0 ; ; thirteenth group, V Z d I ,; fourteenth group, R ff b s l; fifteenth group, G J a e j; sixteenth group, Y S o r i.

The distributing-channels 4 in the arrangement shown are formed by and between a number of plates or shutters 5, pivoted at their lower ends and inclosed in a recess or chamber 7, which may have, although not so shown, a glass front and is of gradually-increasing width from top to bottom, the lower ends of the plates or shutters 5 being spaced apart from each other and from the inner sides of the recess or chamber 7. The recess or chamber 7 may, as shown, be inclined to the horizontal. When the types to be distributed are to be separated into sixteen groups, as in the example taken, there are fifteen shutters 5, so that with the sides of the recess or chamber 7, in which they are inclosed, sixteen channels 4 are formed. The arrangement is such that when a type-key is depressed to detach a type from the line of types under treatment if the proper distributing-channel 4 be not open to direct the detached type to the corresponding type-separating device the shutters 5 will be moved in such a way as to open the proper channel 4.

Figures 1, 10:
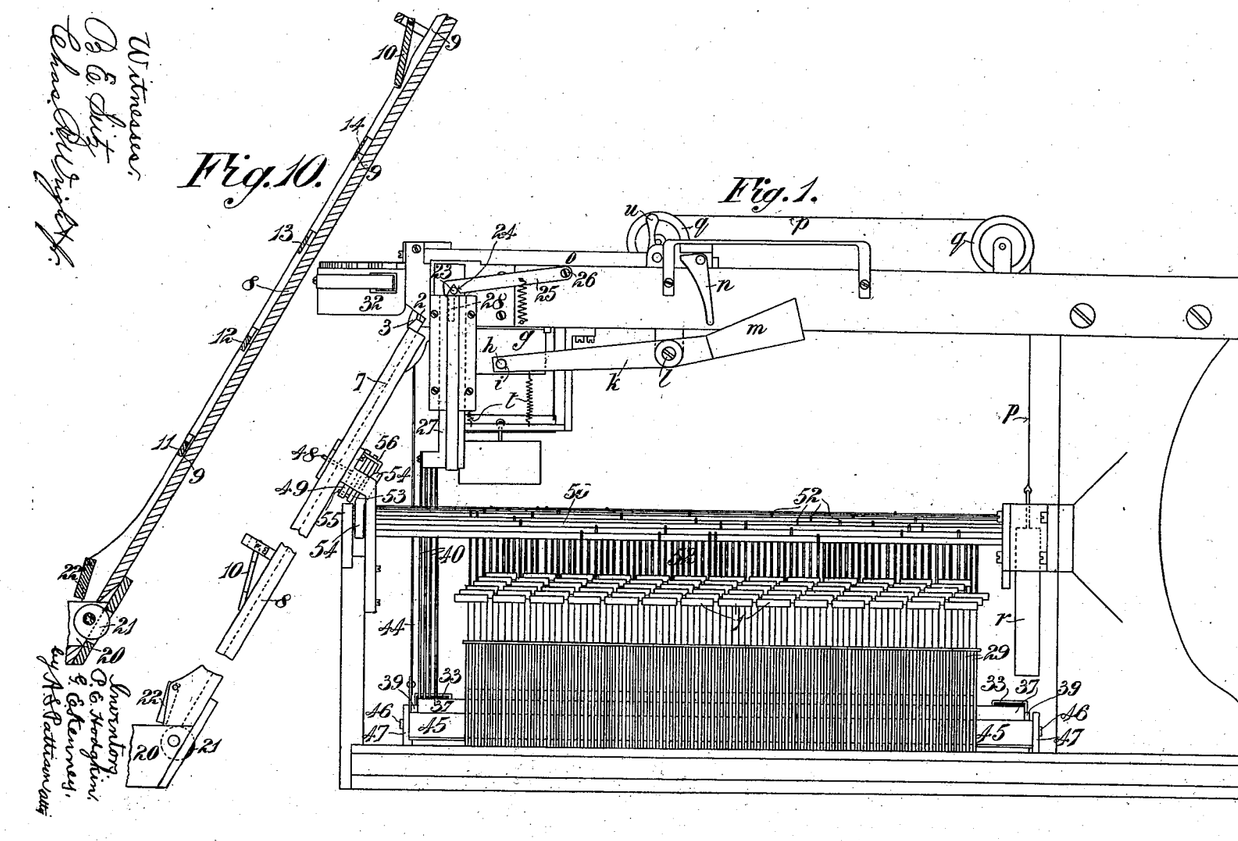
Figure 2:
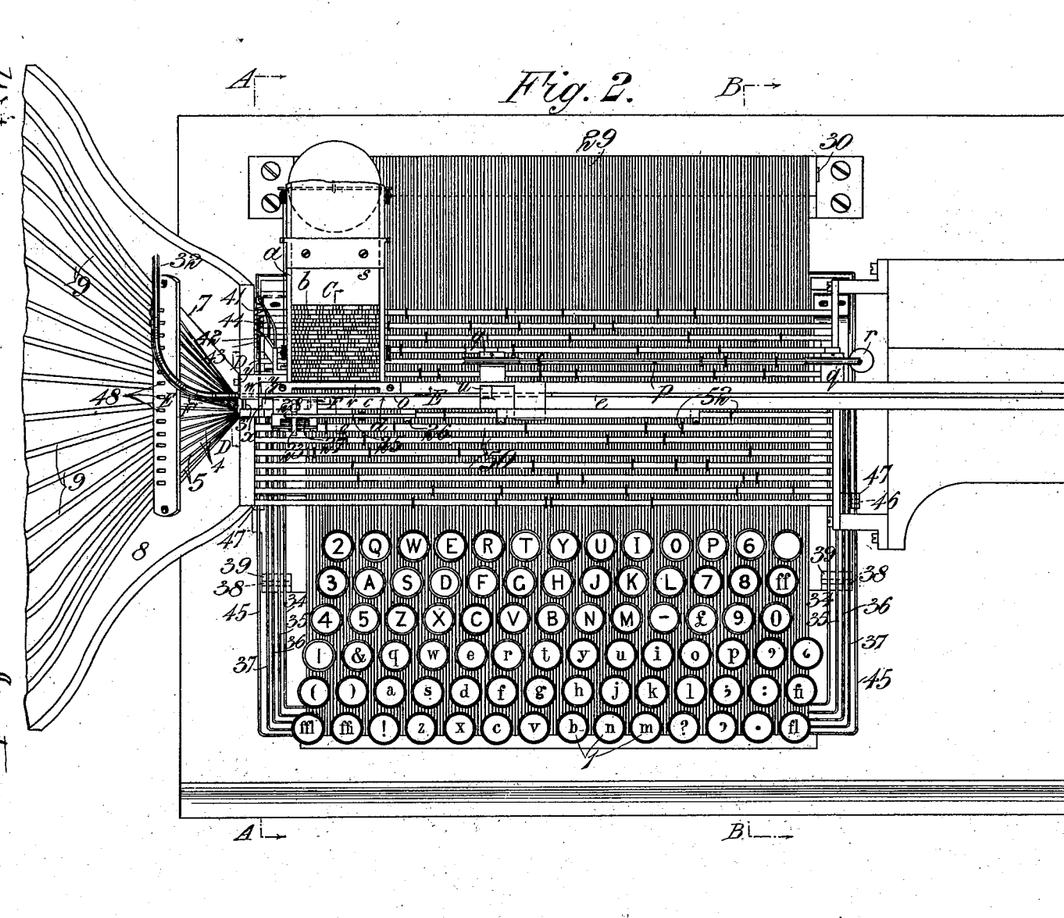
Figure 9:
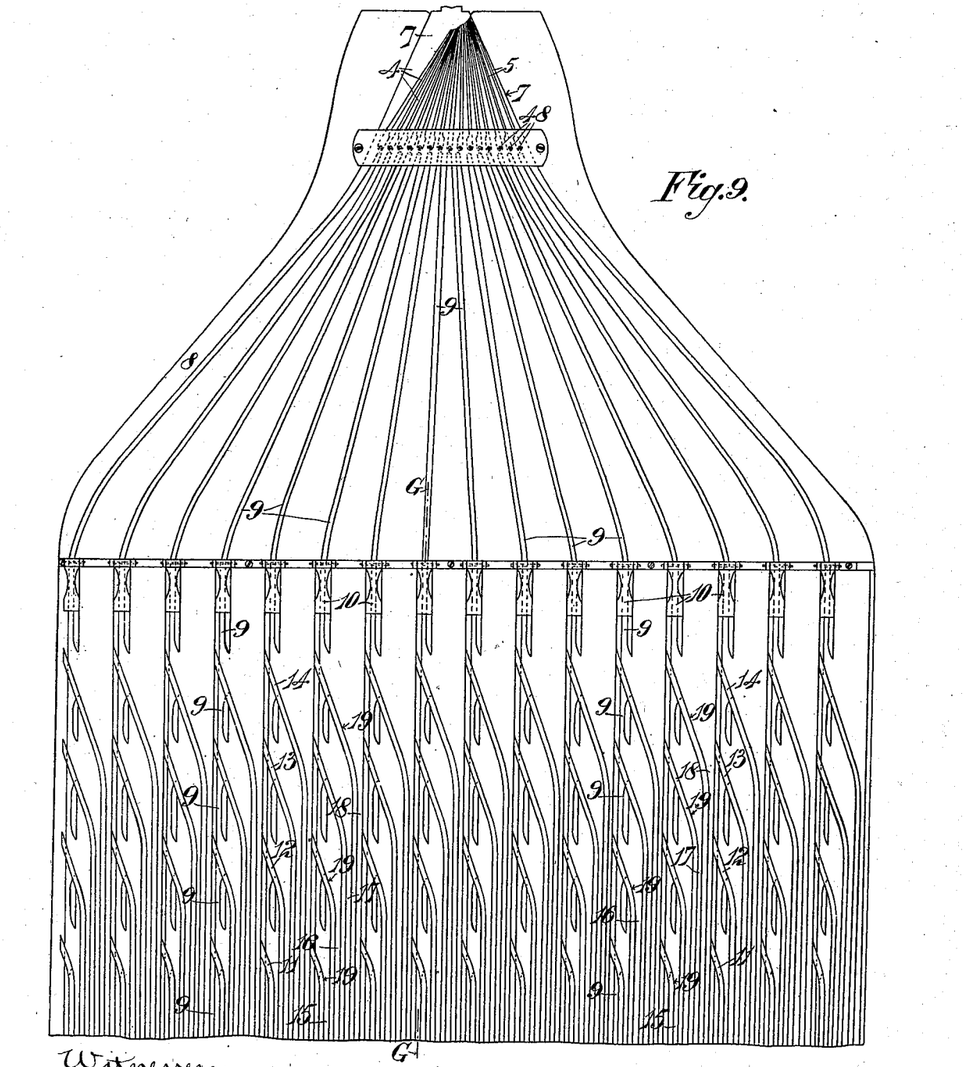
Fig. 9 shows in face view, and Fig. 10 in section on the line G G of Fig. 9, the type distributing and separating devices.
Figures 11, 12:
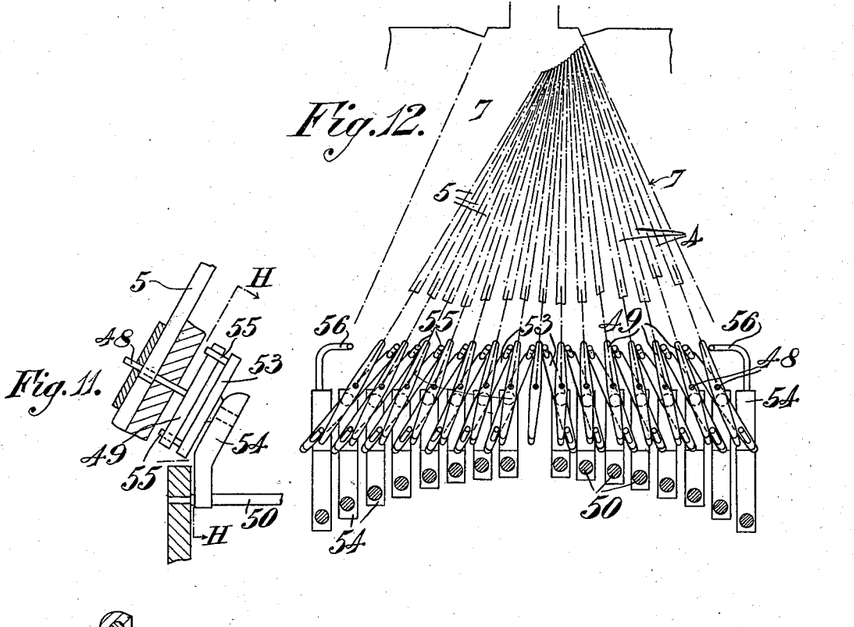

The type selecting or separating device in connection with each distributing-channel 4 comprises, according to the arrangement shown in Figs. 9 and 10, a plate 8, formed with main inlet-channels 9, each of which serves for all the types of a group and may be provided, as shown, with means, such as a pivoted weight or arm 10, to prevent the type turning in such channel while passing therethrough. Each channel 9 at different parts of its length is made of different thicknesses or heights corresponding to the different thicknesses of the several types composing the group which the device is to separate from one another, and at the place where each difference in thickness or height of the channel begins the channel is connected with a separate branch passage and provided with a deflecting or guiding surface, preferably curved, leading to such passages. In the example shown the difference in thickness or height of the channel is made by covering the channel with four bridge-pieces 11, 12, 13, and 14, arranged at different distances from the bottom of the channel, 15, 16, 17, and 18 being the branch passages, leading from the main passage 9, and 19 the deflecting or guiding surfaces. As will be seen, the arrangement is such that the thinnest type of the group directed to each main channel 9 will pass under the bridge-pieces 14, 13, 12, and 11 of the main channel, the next thickest type will pass under the bridge-pieces 14, 13, and 12 and will be deflected by the bottom deflecting or guiding surface 19 into the adjacent branch passage 15, the next thickest type will pass under the bridge-pieces 14 and 13 and will be deflected by the last but one deflecting guiding-surface 19 into the adjacent branch passage 16, and so on for the different thicknesses of the several types of the group, which are thus separated the one from the other. The separated types are led to separate receptacles 20, Fig. 1, each of which may be a trough into which they are or may be packed by a rotary eccentric 21, a pivoted weight or arm 22 being provided to prevent the type turning.

The arrangement of and means for operating the sliding plate or block $z$, type-ejector $y$, and shutters 5 from the type-keys can be variously modified.

In the example shown the sliding plate or block $z$ normally occupies a mid-position, in which it forms a type exit-opening $x$, corresponding in width to that of the third or middle type of a group comprising five types of different widths, and is moved to two different extents to either side of the said mid-position to form openings corresponding in width to the four other types of the group. For this purpose there extends from one side of the block a horizontal pin 23, which extends through a V-shaped notch 24 in one end of a spring-actuated lever 25, that is pivoted at 26 and serves to normally hold the block $z$ in its mid-position, but which will permit the block to be moved to a small extent to either side of such mid-position and will afterward act to return the block to the mid-position when it is relieved of side pressure. Below the pin are four vertically-movable slides 27, Figs. 14, 15, 17, 18, each formed with an open-ended slot 28 at its upper end, two of the slides being adapted to act upon one side of the pin 24 and move the block $z$ to two different extents in one direction—say to the right—and the other two slides being adapted to act upon the opposite side of the pin 24 and move the block $z$ to two other and different extents in the opposite direction—say to the left.

Figure 3:
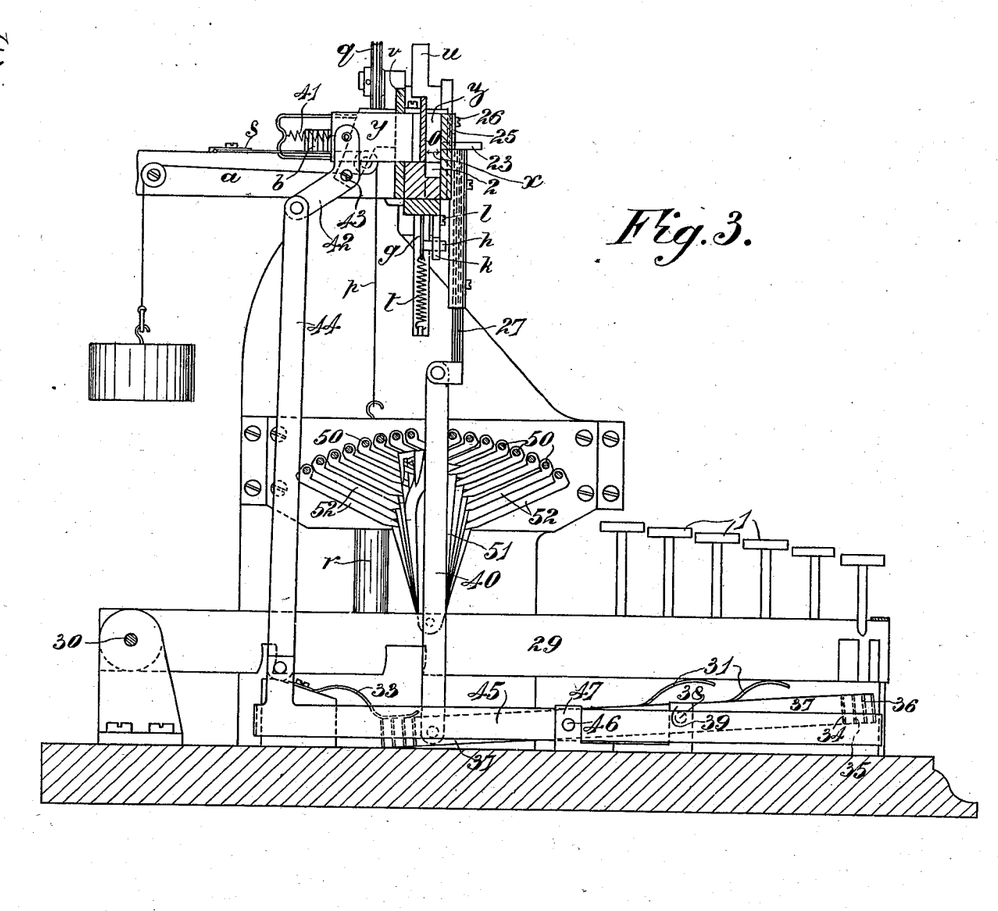
Figs. 3 and 4 are vertical sections on the lines A A and B B, respectively, of Fig. 2.
Figure 4:
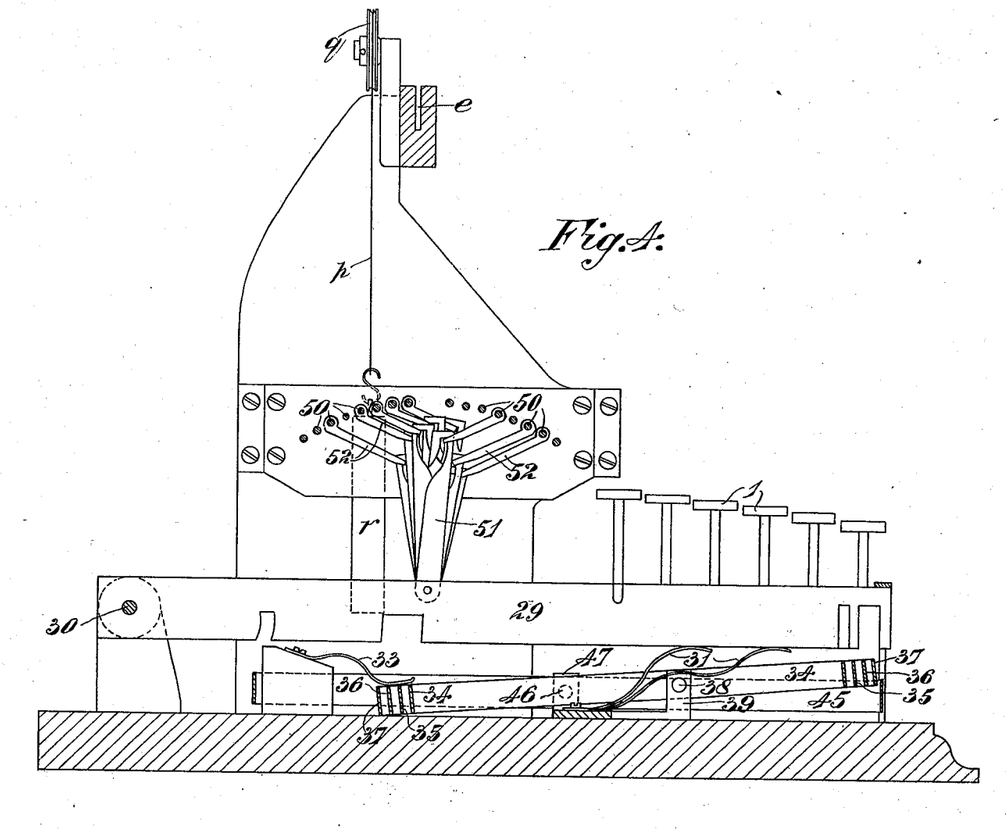

The several type-keys 1 are carried by levers 29, pivoted at their rear ends upon a rod 30 and adapted when depressed against the action of springs 31 to act upon the forward part of one or other of four frames or levers 34 35 36 37. These four frames or levers, which may, as shown, be of rectangular shape, are pivotally arranged one within the other, pivot-pins 38, carried by brackets or lugs 39, being common to the four levers. Each of the four pivotal frames 34, 35, 36, and 37 is arranged to be operated by the keys 1, corresponding to one or other of four of the five different thicknesses of types, and they are each connected through a separate lever or link 40, Fig. 3, to that one of the four vertically-movable slides 27 that is adapted to move the slide-block $z$ sufficiently to allow of the passage of the types corresponding to the keys that act upon the particular frame. 33 are springs that press upon one end of the pivotal frames 34 36 and return them to their normal position after having been operated by the type key-levers.

The type-ejector $y$ is moved in the operative direction against the action of a spring 41 by a bell-crank lever 42, pivoted at 43 and connected, as by a link 44, to one arm of a frame or lever 45, that may be of rectangular shape, as shown, and is pivoted at 46 to a lug or bracket 47 and is arranged to be depressed, so as to operate the ejector $y$ each time any one of the type-keys 1 is depressed, the arrangement being such that upon depressing a type-key one or other of the four frames 34 35 36 37 will be first depressed to adjust the position of the sliding block $x$, if this should need adjustment, after which the fifth frame or lever 45 will be depressed to cause the type-ejector $y$ to make its forward and operative stroke, the parts resuming their normal position by the action of the springs 31 and 41, respectively, when the key is released.

Figures 14, 15:
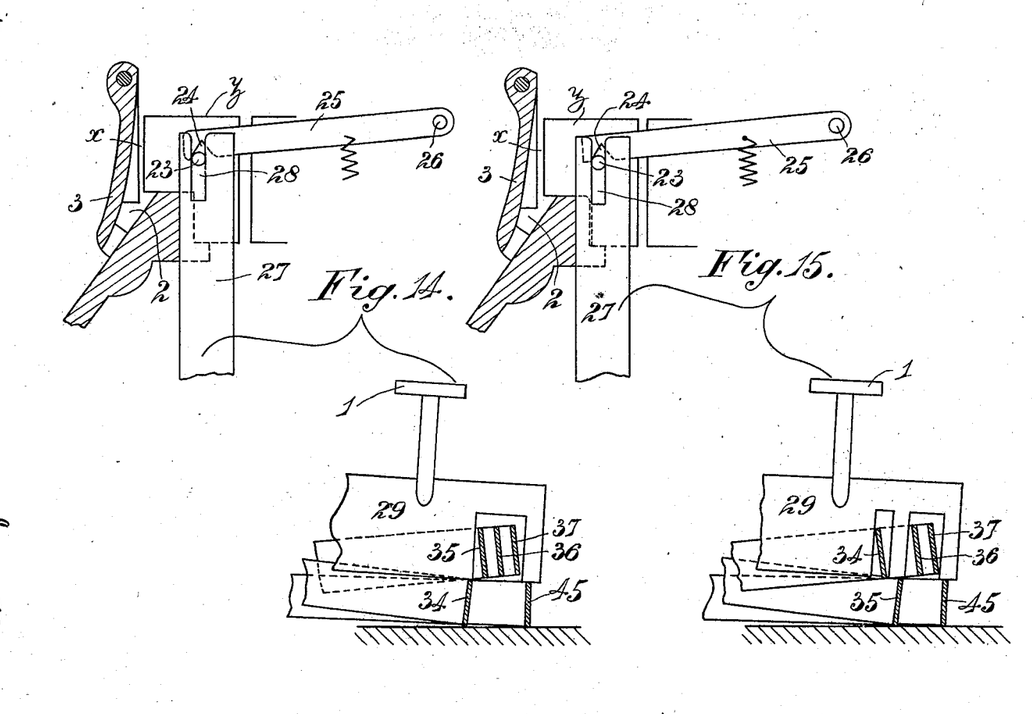
Figs. 14, 15, 16, 17, and 18 show views, to some extent diagrammatic, illustrating the action of certain parts of the machine. The figures are drawn to different scales and in some of them parts are removed to show other parts more clearly.
Figure 16:
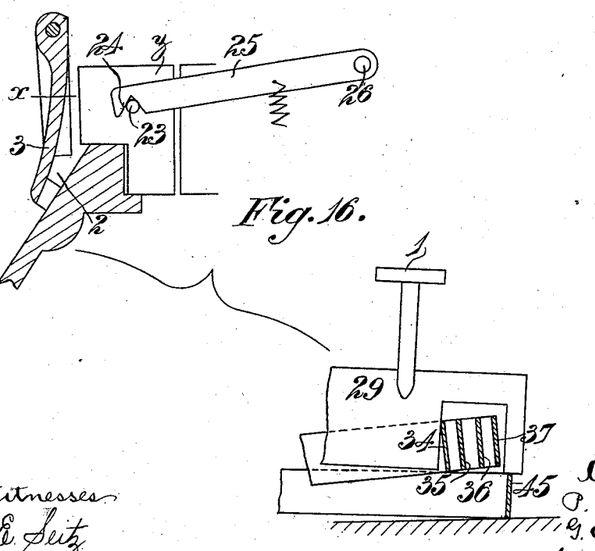
Figure 17:
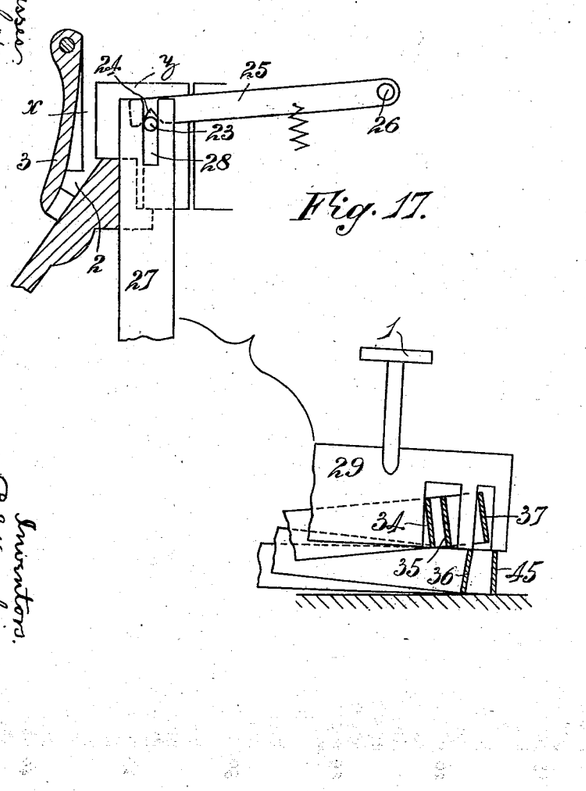
Figure 18:
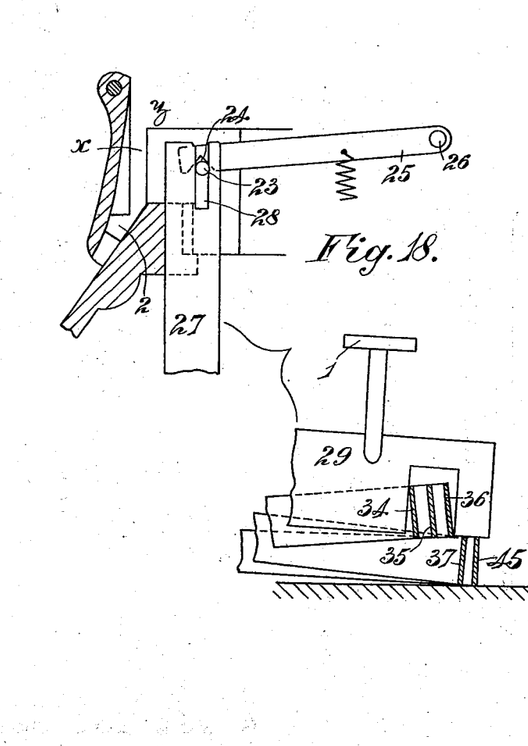

Figs. 14 to 18, inclusive, show the positions of the type-keys 1, key-levers 29, levers 34, 35, 36, 37, and 45, slides 27, slide-block $z$, with pin 23, and notched lever 25 when type-keys 1, corresponding to the five different thicknesses of type, are successively operated, Fig. 14 showing the relative position of the parts when the type exit-opening $x$ is set for the exit of type of least thickness, and Figs. 15, 16, 17, and 18 the positions of the parts when the said opening is set for the exit of type of the second, third, fourth, and fifth degree of thickness, respectively. In these figures it will be seen that the levers 34, 35, 36, 37, and 45 are so arranged and the lower side of each key-lever 29 is so notched that when the corresponding type-key 1 is depressed the key-lever will first depress the corresponding levers 34, 35, 36, or 37 and afterward the lever 45, except in the case of Fig. 16, corresponding to the mid-position of the slide-block $z$, where only the lever 45 is depressed.

Figure 13:
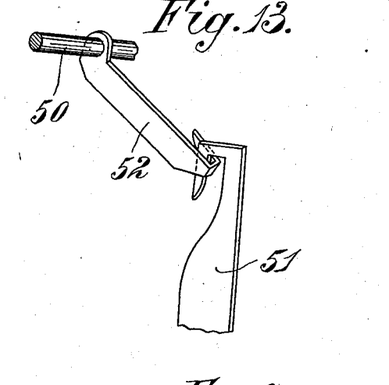

For operating the several shutters 5 each shutter is fixed upon a spindle 48, that extends through the back of the recess or chamber 7, in which the shutters 5 are mounted, and is provided on its rear end with a two-armed lever 49, adapted to be rocked in opposite directions by one or other of sixteen rock-shafts 50, arranged horizontally above the levers 29, carrying the type-keys 1. Each of the rock-shafts 50 is connected to each of the five levers 29, carrying the type-keys 1, corresponding to one or other of the groups of types in such a manner that when any key is depressed, if the proper channel 4 is not open for the passage of the type to be ejected, the corresponding rock-shaft 50 will be operated and move one or more of the shutters 5, so as to open the proper channel 4, which will then remain open until the key corresponding to a type of a different group is operated, when the shutters 5 will be again reset to open the proper channel 4 for such type. The connection between each key-lever 1 and the corresponding rock-shaft 50 may conveniently comprise two hook-like parts 51 and 52, (see Fig. 13,) so arranged, as shown, that the rock-shaft 50 will only be operated on the descent of the key. The connection between each rock-shaft 50 and the corresponding shutter 5, except as to each extreme end rock-shaft, may conveniently be effected by means of a two-armed lever 53, pivoted to an arm 54, fixed on one end of the rock-shaft 50 and provided with two pins 55, arranged one at each end of the two-armed lever 53 and arranged so as to embrace between them the two-armed lever 49, fixed on the spindle 48 of the corresponding shutter 5. Each extreme end rock-shaft 50 has a pin 56 fixed to its arm 54 and so arranged as to act against one arm only of the lever 49, fixed on the spindle 48 of the corresponding shutter 5. The arrangement is such that movement of any one of the rock-shafts 50 in one direction will operate the corresponding shutter 5 and also all the shutters 5 that may be on one side of such shutter to open the proper channel 4 for the passage of the type to be ejected.

The action of the machine is as follows: Assuming a line of type to be in the trough or guideway $e$, then upon depressing the type-key 1, corresponding to the foremost type to be separated from the line of type, which the machine operator can determine by looking at either the line of type itself or at a copy of the matter printed from the column or form the types in which are to be distributed, the sliding plate or block $z$, forming one side of the type exit-opening $x$ from the trough $e$, will be first moved sufficiently to admit of the passage of the foremost type, unless this type corresponds in thickness to the normal width of opening, in which case the plate or block $z$ does not move, after which the type-ejector $y$ will be operated to eject the foremost type and cause it to fall through the type exit hole or passage 2. The operation of the type-key will also move the pivoted shutters 5 unless the particular channel 4 left open be the proper one for the type to be ejected, in which case the shutters 5 will remain at rest, the ejected type in each case passing through the open channel 4 to the type-separating device. Upon spaces being brought opposite the space-opening $w$ in the end of the type-trough $e$, they will be automatically forced into and afterward through such opening and it may be into a space-trough 32 by the action of the follower $o$ bearing against the line of types, the top of the space-opening $w$ preventing the passage through such opening of the next foremost type, which will be further supported by the last-removed space, which will fill the space-opening $w$ until displaced by a succeeding space.

It will be evident that apparatus according to this invention can be constructed in various forms and that various changes can be made in the details of construction of such apparatus without departing from the spirit and scope of the invention so long as the mode of operation described in the specification or the relative arrangement of parts shown in the drawings is preserved.

What we claim is—

1. A type-distributing machine comprising type-feeding mechanism adapted to feed the type in line, type-ejecting mechanism adapted to separate the types one at a time from the line thereof, a type distributing or grouping device arranged below said type-ejecting mechanism and into which all the type fall, said device being adapted to divide the types into groups and direct the type one by one into one or other of a series of channels corresponding to the particular group to which the ejected type belongs, and a plurality of type-separating devices corresponding to and in communication with the several grouping-channels and each adapted to automatically separate from each other the types corresponding to the particular group of types fed into the same.

2. A type-distributing machine comprising a feed-trough having an exit-opening for types and a separate exit-opening for spaces, mechanism for feeding mixed type and spaces along said trough, type-ejecting mechanism adapted to force the types one by one through the type exit-opening, a type distributing or grouping device adapted to receive the ejected types and divide them into groups, and stationary type-separating devices connected with the type distributing or grouping device and each adapted to automatically separate the type belonging to one group from each other.

3. A type-distributing machine comprising a support for types in column form, a type-trough having a type exit-opening, means for lifting lines of types one at a time from said support and placing them in said trough, mechanism for feeding a line of types along said trough toward said type exit-opening, mechanism adapted to eject the successive type through said exit-opening, a type distributing or grouping device adapted to receive ejected type and direct them into one or other of a series of channels less in number than the different kinds of types to be distributed so as to divide the several types of a font into groups, and a stationary type-separating device adapted to automatically separate the types fed through each channel from one another.

4. In a type-distributing machine, a type-galley having at one end a wall formed with a recess the bottom of which is above the level of said galley and is adapted to carry a line of types, means for pressing a column of types against said wall, a trough arranged in line with said recess and having at one end separate exit-openings for types and spaces, a vertically-movable pusher adapted to raise the foremost line of types to the level of the bottom of said recess, means for operating said pusher, means for feeding a line of types along said recess and trough toward said exit-holes, and means for ejecting the foremost type through the type exit-opening.

5. In a type-distributing machine, a type-trough having a space exit-opening at one end of a height equal to that of the spaces to be distributed and a type exit-opening at one side thereof, a pusher adapted when operated to force the foremost type through said type exit-opening, means for operating said pusher, means for lifting a line of types from a column thereof to the level of said trough, means for forcing the raised line of types sidewise into the trough, feeding mechanism for forcing said line of types toward said exit-openings, and means carried by said feeding mechanism for actuating the type-lifting means when said feeding mechanism is drawn back to its starting position, substantially as described.

6. In a type-distributing machine, a type-trough having a type exit-opening one side of which is formed by a movable block or plate, that is normally held in a mid-position and is capable of moving in opposite directions from said mid-position and key-operated mechanism adapted to move said block or plate endwise from its normal position to different extents in each direction to vary the width of said type exit-opening to suit the particular type to be ejected.

7. In a type-distributing machine, a type-trough having a type exit-opening one side of which is formed by an endwise movable block, but is capable of moving in opposite direction from its normal position, a device adapted to hold said block in its normal position but capable of yielding to allow of said block being moved endwise, separate adjusting devices each adapted to move said block endwise from its normal position to a different extent, type-ejecting mechanism, and key-actuated mechanism for operating said adjusting devices.

8. In a type-distributing machine, a type-trough having a type exit-opening one side of which is formed by an endwise-movable block having a projecting part, a spring-lever having a notched portion engaging said projecting part and adapted to hold said block in a yielding manner in its normal position, two sets of separate adjusting devices adapted to act against opposite sides of said pin and move said block endwise to different extents, and key-actuated mechanism connected to said adjusting devices.

9. In a type-distributing machine, a type-trough having a type exit-opening one side of which is formed by an endwise-movable block, a device adapted to hold said block in its normal position but capable of yielding to allow of said block being moved endwise, separate adjusting devices each adapted to move said block endwise from its normal or stationary position in either direction and to a different extent, pivoted frames or levers each connected to one of said adjusting devices, and a series of key-levers, key-levers corresponding to types of given thickness, excepting those of a given normal thickness, acting to operate the corresponding pivoted frame or lever, substantially as described for the purpose specified.

10. In a type-distributing machine, a type-trough having a type exit-opening one side of which is formed by an adjustable block, type-ejecting mechanism, a type discharge-passage arranged below said type exit-opening and leading to a type-separating device, and means comprising a pivoted weight adapted to prevent turning of the types while falling through said discharge-passage, substantially as described.

11. In a type-distributing machine, a type-trough having at one end an exit-opening in line with the trough and of a height above the floor of the trough corresponding to that of a space, and two transverse openings formed through the front and back walls of the trough adjacent to said end exit-opening, the opening in the front wall being adjustable in width, a type-ejector arranged to work through the rear opening and force the foremost type of a line of types in said trough through the type exit-opening, key-actuated mechanism for adjusting the width of the type exit-opening to suit the width of the type to be ejected, and means for actuating said type-ejector.

12. In a type-distributing machine, a type grouping or distributing device comprising a support having an inlet-channel for the types to be distributed, a series of plates or shutters fixed at their lower ends to spindles journaled in the back wall of said support and spaced apart at their lower ends so that a series of type-distributing channels can be formed between them, a series of levers each fixed on the rear end of a shutter-spindle, a series of rock-shafts each carrying a lever provided with two pins arranged to embrace one of the levers on the shutter-spindle, and key-operated levers, each of the rock-shafts being adapted to be operated by each of the key-levers corresponding to the types belonging to a particular group of types.

13. In a type-distributing machine, a type grouping or distributing device comprising a chamber or recess of gradually-increasing width from top to bottom and having a type-inlet channel at the top and a series of type-distributing channels at the bottom, a series of plates or shutters fixed at their lower end to spindles journaled in the back wall of said chamber or recess and arranged to rest against one another at their upper ends and spaced apart from each other and from the inner sides of said chamber at their lower ends, a series of levers each fixed on the rear end of a shutter-spindle, a series of rock-shafts each carrying a lever provided with two pins arranged to embrace one of the levers on the shutter-spindle, and key-operated levers, each of the rock-shafts being adapted to be operated by each of the key-levers corresponding to the types belonging to a particular group of types.

14. In a type-distributing machine, the combination with type-ejecting mechanism, of a type grouping or distributing device comprising a support having a type inlet-channel, a series of plates or shutters fixed to spindles in said support and capable of forming between them a series of type-distributing channels, a series of rock-shafts each adapted to rock the corresponding spindle and shutter and another shutter or shutters that may be resting against it, and key-operated levers, each of said rock-shafts being adapted to be operated by each of the said levers corresponding to the particular types corresponding to a given group of types.

15. In a type-distributing machine, the combination with type-ejecting mechanism, of a type grouping or distributing device comprising a support having a type inlet-channel, a series of plates or shutters pivoted to said support and capable of forming between them a series of type-distributing channels, and each carried by a spindle journaled in said support and provided on its rear end with a two-armed lever adapted to be rocked in opposite directions, a series of key-operated type-levers, and a series of rock-shafts, each adapted to be operated in one direction only from each of the type-levers corresponding to the particular types belonging to a given group of types, each of said rock-shafts except the outermost ones, being pivoted with an arm carrying a two-arm lever provided with pins or projections arranged to extend at opposite sides of the two-arm lever on the corresponding shutter-spindle, and the two outermost rock-shafts being each provided with an arm carrying a single pin, substantially as described for the purpose specified.

16. In a type-distributing machine, a type separating or selecting device comprising a box having a main inlet-channel that serves for the entrance of the different types to be automatically separated from each other and which at different parts is made of different thicknesses or heights corresponding to the different thickness of types to be separated, branch passages extending from the main channel at the points where the thickness or height is varied, and deflecting or guiding surfaces between the main and branch passages.

17. In a type-distributing machine, type-ejecting mechanism, a type grouping or distributing device comprising a support having a type inlet-channel through which the ejected type fall, a series of plates or shutters pivoted to said support and capable of forming between them a series of type-distributing channels, and key-actuated mechanism for moving one or other of said plates or shutters to open the proper channel for the type about to be ejected, and an automatic type separating or selecting device having a series of main type-channels corresponding to the several distributing-channels and each of which is made at different parts of its length of different thickness or heights corresponding to the different thicknesses of the types in the group of types to be separated from one another and is provided at the parts where the alteration of thickness or height takes place with branch channels and deflecting or guiding surfaces between said main and branch channels, substantially as described.

18. In a type-distributing machine, the combination with type-ejecting mechanism of a type grouping or distributing device comprising a chamber having a type inlet-channel through which the ejected types fall, a series of plates or shutters carried by spindles journaled in the back of said support and capable of forming between them a series of type-distributing channels, levers fixed to said spindles, key-operated type-levers and rock-shafts each adapted to be operated in one direction only from certain of said type-levers and to operate the lever on the corresponding shutter-spindle, and an automatic type separating or selecting device comprising a series of main type-channels corresponding to the several distributing-channels and each of which is provided at different parts along its length with bridge-pieces arranged at different distances from the bottom of the channel corresponding to the different thicknesses of the types to be separated and with branch passages and lateral deflecting or guiding surfaces adjacent to said bridge-pieces, substantially as described for the purposes specified.

19. A type-distributing machine comprising a main type-channel; a series of minor type-channels communicating with and leading from said main channel; means for feeding type into said main channel; and means for diverting the type, according to thickness from said main channel into said minor channels.

Signed at 77 Cornhill, London, E. C., this 27th day of November, 1899.

PHILIP ELIOT HODGKIN.
GEORGE ENOS KENNEY.

Witnesses:
PERCY E. MATTOCKS,
EDMUND S. SNEWIN.